United States Patent
Kowalczyk et al.

(10) Patent No.: US 7,583,885 B2
(45) Date of Patent: Sep. 1, 2009

(54) FIBER DISTRIBUTION ENCLOSURE

(75) Inventors: Scott C. Kowalczyk, Savage, MN (US); Jonathan R. Kaml, Shakopee, MN (US); Trevor D. Smith, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/725,139

(22) Filed: Mar. 15, 2007

(65) Prior Publication Data

US 2008/0124038 A1   May 29, 2008

Related U.S. Application Data

(60) Provisional application No. 60/861,750, filed on Nov. 28, 2006.

(51) Int. Cl.
*G02B 6/00* (2006.01)
(52) U.S. Cl. .................................. 385/135; 385/134
(58) Field of Classification Search .................. 385/135
See application file for complete search history.

(56) References Cited

U.S. PATENT DOCUMENTS

| | | | |
|---|---|---|---|
| 5,497,444 A | 3/1996 | Wheeler | |
| 5,717,810 A | 2/1998 | Wheeler | |
| 5,734,776 A * | 3/1998 | Puetz | 385/134 |
| 6,330,389 B1 * | 12/2001 | Daoud et al. | 385/135 |
| 6,359,228 B1 | 3/2002 | Strause et al. | |
| 6,411,767 B1 | 6/2002 | Burrous et al. | |
| 6,483,977 B2 | 11/2002 | Battey et al. | |
| 6,493,501 B2 | 12/2002 | Flores et al. | |
| 6,496,640 B1 | 12/2002 | Harvey et al. | |
| 6,539,160 B2 | 3/2003 | Battey et al. | |
| 6,542,688 B1 | 4/2003 | Battey et al. | |
| 6,560,394 B1 | 5/2003 | Battey et al. | |
| 6,591,051 B2 | 7/2003 | Solheid et al. | |
| 6,621,975 B2 * | 9/2003 | Laporte et al. | 385/135 |
| 6,654,536 B2 | 11/2003 | Battey et al. | |
| 6,766,094 B2 * | 7/2004 | Smith et al. | 385/135 |

(Continued)

FOREIGN PATENT DOCUMENTS

WO   WO 2004/086112 A1   10/2004

OTHER PUBLICATIONS

U.S. Appl. No. 11/354,297, filed Feb. 13, 2006.

*Primary Examiner*—Frank G Font
*Assistant Examiner*—Ryan Lepisto
(74) *Attorney, Agent, or Firm*—Merchant & Gould P.C.

(57) ABSTRACT

An optical fiber distribution assembly is disclosed. The assembly includes an enclosure formed by a base and a cover joined at a waterproof seal. The base includes openings configured to accept an input cable and an output cable. The assembly also includes a mounting structure having front and rear sides and residing within the interior of the enclosure. The mounting structure forms a planar surface connected to the base and extending within the enclosure. The assembly includes a splitter housing located on the front side. The splitter housing includes a fiber optic splitter configured to split the input signal into a plurality of secondary signals. The assembly also includes a plurality of adapters located on the front side and including first and second connection ends for receiving a connector terminated to optical cables. The assembly includes an excess connector storage structure for terminating disconnected optical cables.

33 Claims, 16 Drawing Sheets

U.S. PATENT DOCUMENTS

| | | | |
|---|---|---|---|
| 6,778,752 B2* | 8/2004 | Laporte et al. | 385/135 |
| 6,792,191 B1 | 9/2004 | Clapp, Jr. et al. | |
| 6,798,967 B2 | 9/2004 | Battey et al. | |
| 6,856,747 B2* | 2/2005 | Cloud et al. | 385/135 |
| 7,013,074 B2* | 3/2006 | Battey et al. | 385/135 |
| 7,038,137 B2* | 5/2006 | Grubish et al. | 174/93 |
| 7,142,764 B2 | 11/2006 | Allen et al. | |
| 7,190,874 B1* | 3/2007 | Barth et al. | 385/135 |
| 7,194,181 B2 | 3/2007 | Holmberg et al. | |
| 7,198,409 B2 | 4/2007 | Smith et al. | |
| 7,218,827 B2 | 5/2007 | Vongseng et al. | |
| 7,233,731 B2 | 6/2007 | Solheid et al. | |
| 7,260,301 B2* | 8/2007 | Barth et al. | 385/135 |
| 7,308,183 B2* | 12/2007 | Kowalczyk et al. | 385/135 |
| 7,327,926 B2* | 2/2008 | Barth et al. | 385/135 |
| 7,330,628 B1* | 2/2008 | Kowalczyk et al. | 385/135 |
| 7,352,945 B2* | 4/2008 | Holmberg et al. | 385/135 |
| 7,418,183 B2* | 8/2008 | Wittmeier et al. | 385/135 |
| 2003/0112964 A1 | 6/2003 | Morgan et al. | |
| 2003/0231849 A1 | 12/2003 | Rodriguez et al. | |
| 2005/0105873 A1 | 5/2005 | Reagan et al. | |
| 2005/0129379 A1 | 6/2005 | Reagan et al. | |
| 2005/0207711 A1 | 9/2005 | Vo et al. | |
| 2006/0083475 A1* | 4/2006 | Grubish et al. | 385/135 |
| 2006/0093301 A1 | 5/2006 | Zimmel et al. | |
| 2006/0193587 A1* | 8/2006 | Wittmeier et al. | 385/135 |
| 2006/0193588 A1* | 8/2006 | Mertesdorf et al. | 385/135 |
| 2006/0263029 A1 | 11/2006 | Mudd et al. | |
| 2006/0269204 A1 | 11/2006 | Barth et al. | |
| 2006/0269205 A1 | 11/2006 | Zimmel | |
| 2006/0269206 A1 | 11/2006 | Zimmel | |
| 2007/0025675 A1 | 2/2007 | Kramer | |
| 2007/0031100 A1* | 2/2007 | Garcia et al. | 385/135 |
| 2007/0047894 A1 | 3/2007 | Holmberg et al. | |

* cited by examiner

FIBER DISTRIBUTION ENCLOSURE

CROSS REFERENCE TO RELATED APPLICATIONS

This application claims priority to U.S. Provisional Patent Application No. 60/861,750, filed Nov. 28, 2006, the disclosure of which is hereby incorporated by reference in its entirety.

TECHNICAL FIELD

The present invention relates generally to optical fiber management. In particular, the present invention relates to optical fiber management in a fiber distribution assembly.

BACKGROUND

Outside plant (OSP) telecommunications equipment, including terminations and splitters, may be housed in protective enclosures. The enclosures may be above ground, or may be below ground. Below-ground solutions are known which store the equipment in a below-ground vault. The vault is typically accessible through a top door.

As demand for telecommunications services increases, optical fiber services are being extended into additional areas. In new construction developments in which future demand for telecommunications services is unknown, it may be cost effective to provide for service capacity which exceeds the current demand. This will allow a telecommunications service provider to quickly and cost-effectively respond to future growth in demand. Optical fiber cables may be extended to a customer's premises prior to that customer actually requesting or needing service. For example, cables may be extended to premises adjacent the premises of a current customer, as it may be cost effective to extend both cables at the same time. Or, the cables may be extended to new building sites in anticipation of the new occupants of those sites requesting fiber optic service.

Large-scale OSP telecommunications equipment may have enclosures which are visually unpleasant. Attempts to conceal this equipment by placing it below the ground can cause difficulties for technicians desiring to access and service the equipment.

SUMMARY

The present invention relates to a fiber optic telecommunications distribution assembly and management of optical cables.

According to a first aspect, an optical fiber distribution assembly is disclosed. The assembly includes an enclosure having a top, a bottom, and an interior. The enclosure is formed by a base and a cover joined at a waterproof seal. The base includes a plurality of openings configured to accept an input cable carrying an input signal and an output cable carrying an output signal. The assembly also includes a mounting structure within the interior of the enclosure. The mounting structure forms a planar surface having a front side, a rear side, and top and bottom ends, the bottom end connected to the base and the top end extending toward the top of the enclosure within the interior of the enclosure. The assembly further includes a splitter housing located on the front side of the mounting structure adjacent the bottom end. The splitter housing includes a fiber optic splitter, the fiber optic splitter configured to split the input signal into a plurality of secondary signals. The assembly also includes a plurality of adapters located on the front side of the mounting structure adjacent the top end. Each adapter includes a first connection end for receiving a connector terminated to a cable carrying one of the secondary signals and a second connection end for receiving a connector terminated to an optical cable. The assembly also includes an excess connector storage structure on the front side of the mounting structure adjacent the bottom end. The excess connector storage structure is configured to provide a termination location for optical cables carrying the plurality of secondary signals when not connected to a customer via an output cable.

According to a second aspect, a method of routing fiber optic signals is disclosed. The method includes accessing an interior of a fiber optic distribution assembly. The method also includes detaching an optical cable carrying a secondary signal from an excess connector storage structure in the assembly. The method also includes routing the optical cable to an adapter via at least one radius limiter and at least one of a plurality of fanouts in the assembly.

In various additional aspects, radius limiters, fanouts, and additional fiber optic routing equipment are included. Additionally, an excess connector storage structure can be included, and is configured to store optical cable carrying secondary signals when not connected for use by a customer.

DETAILED DESCRIPTION

Figure 1:
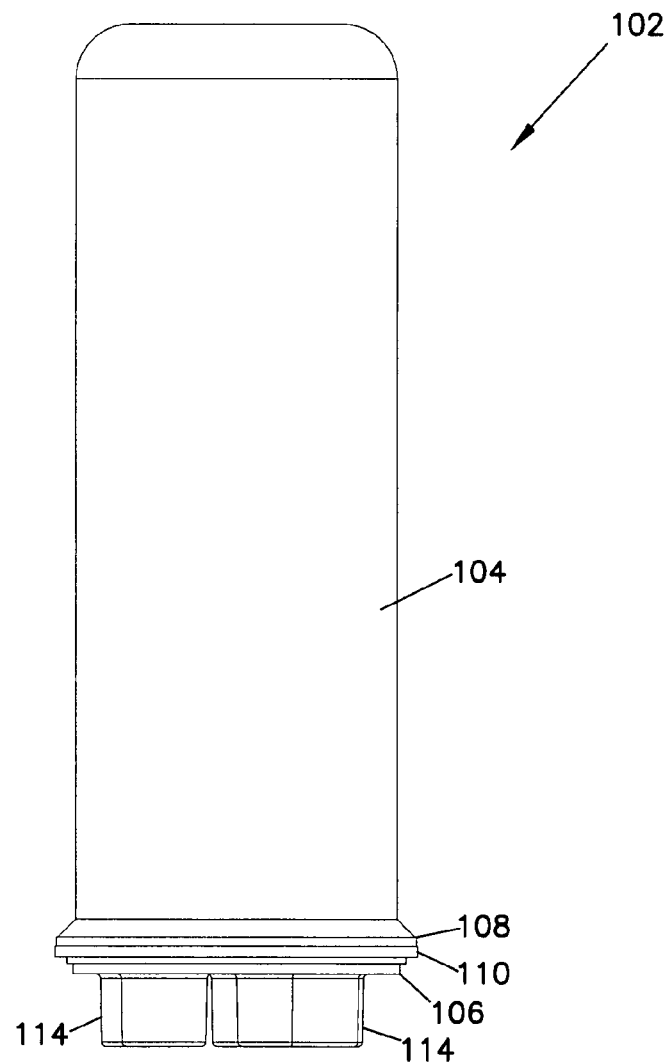
FIG. 1 is a front plan view of a fiber optic enclosure useable to implement various aspects of the present disclosure.

The present disclosure is generally related to a fiber optic distribution assembly, such as can be used in a variety of above ground and below ground outside plant (OSP) environments. Various embodiments of the present disclosure will be described in detail with reference to the drawings, wherein like reference numerals represent like parts and assemblies throughout the several views. Reference to particular embodiments does not limit the scope of the invention, which is limited only by the scope of the claims attached hereto. Additionally, any examples set forth in this disclosure are not intended to be limiting and merely set forth some of the many possible embodiments for the claimed invention.

Figure 2:
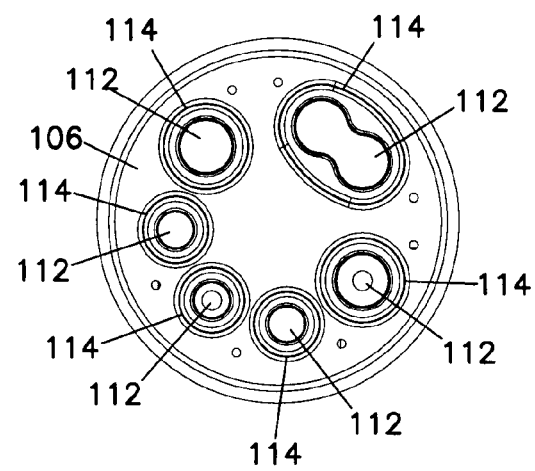
FIG. 2 is a bottom plan view of the fiber optic enclosure of FIG. 1.
Figure 3:
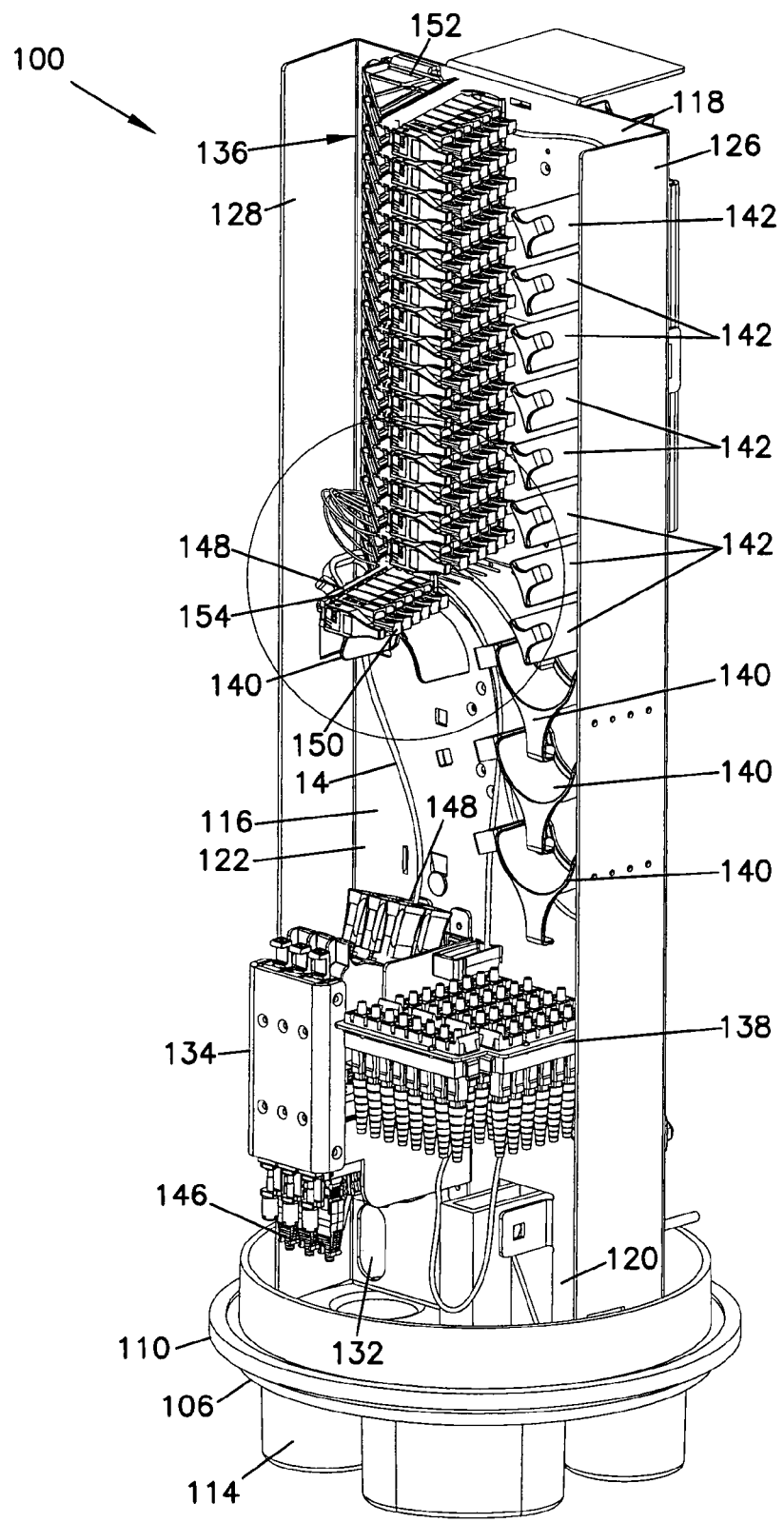
FIG. 3 is a front perspective view of a fiber optic distribution assembly shown with the cover removed to provide access to inner components of the assembly and incorporating fiber optic cabling to illustrate optical signal routing.
Figure 4:
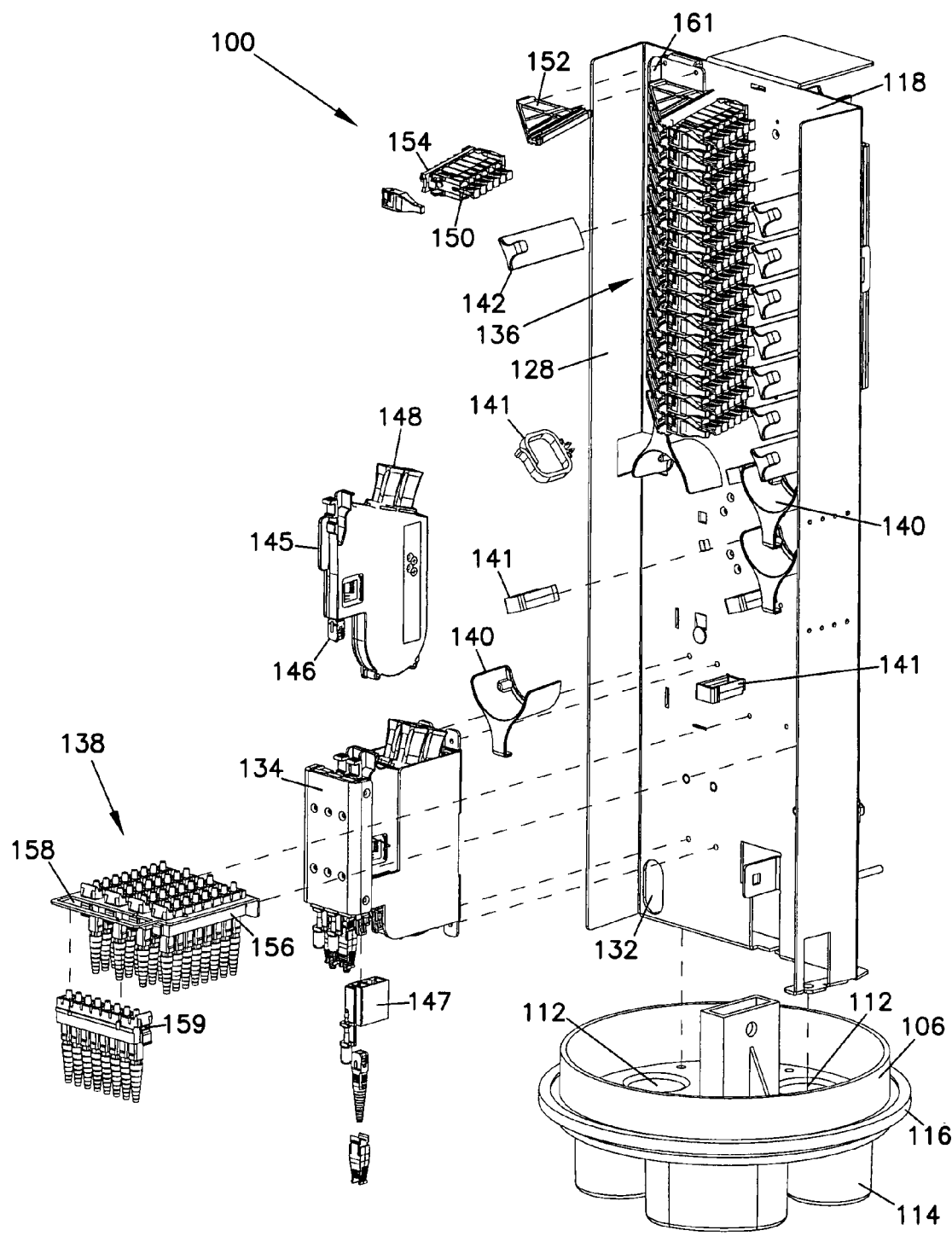
FIG. 4 is a front perspective exploded view of the fiber optic distribution assembly of FIG. 3, with cabling removed.
Figure 5:
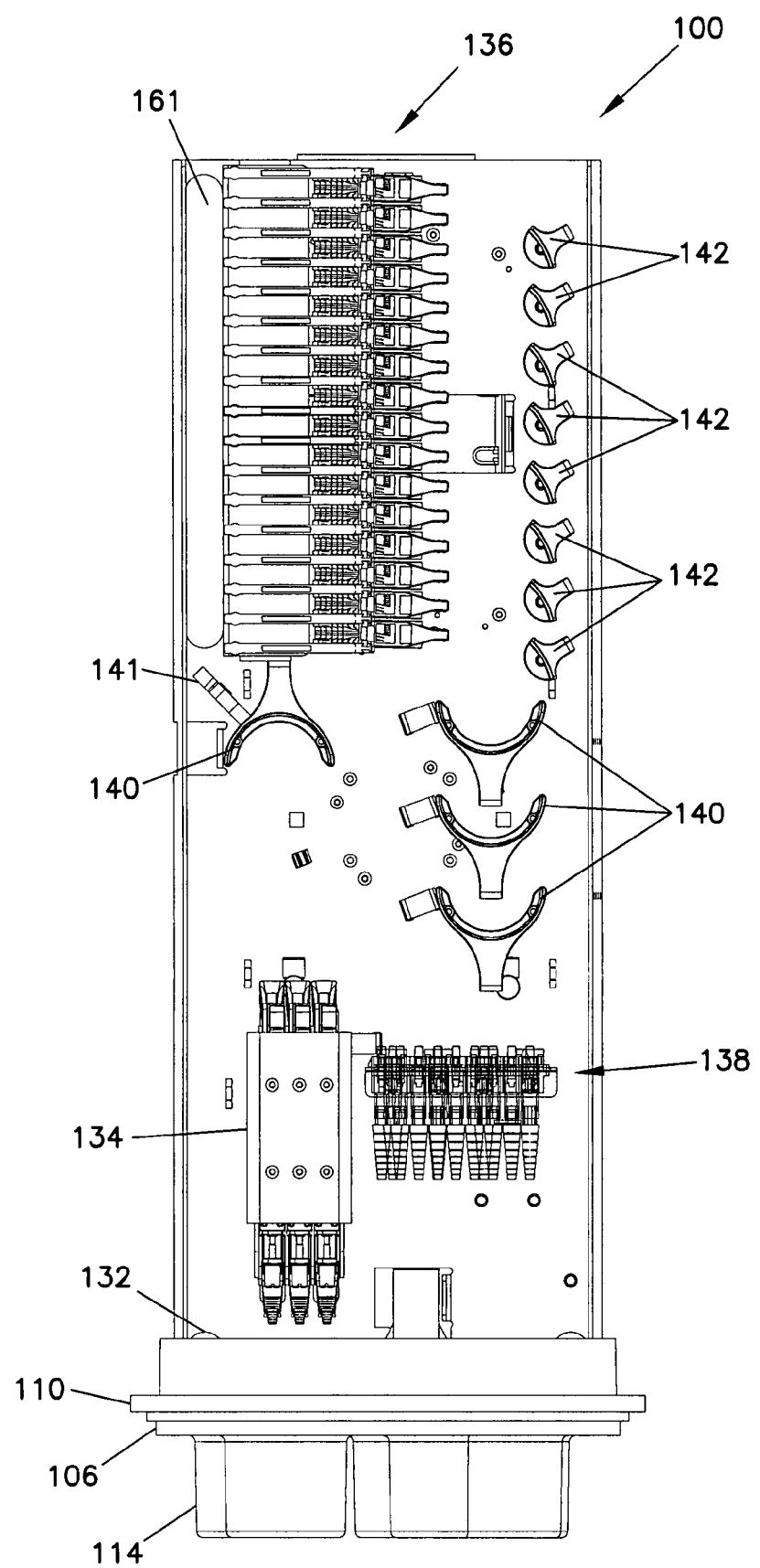
FIG. 5 is a front plan view of the fiber optic distribution assembly of FIG. 3, with cabling removed.
Figure 6:
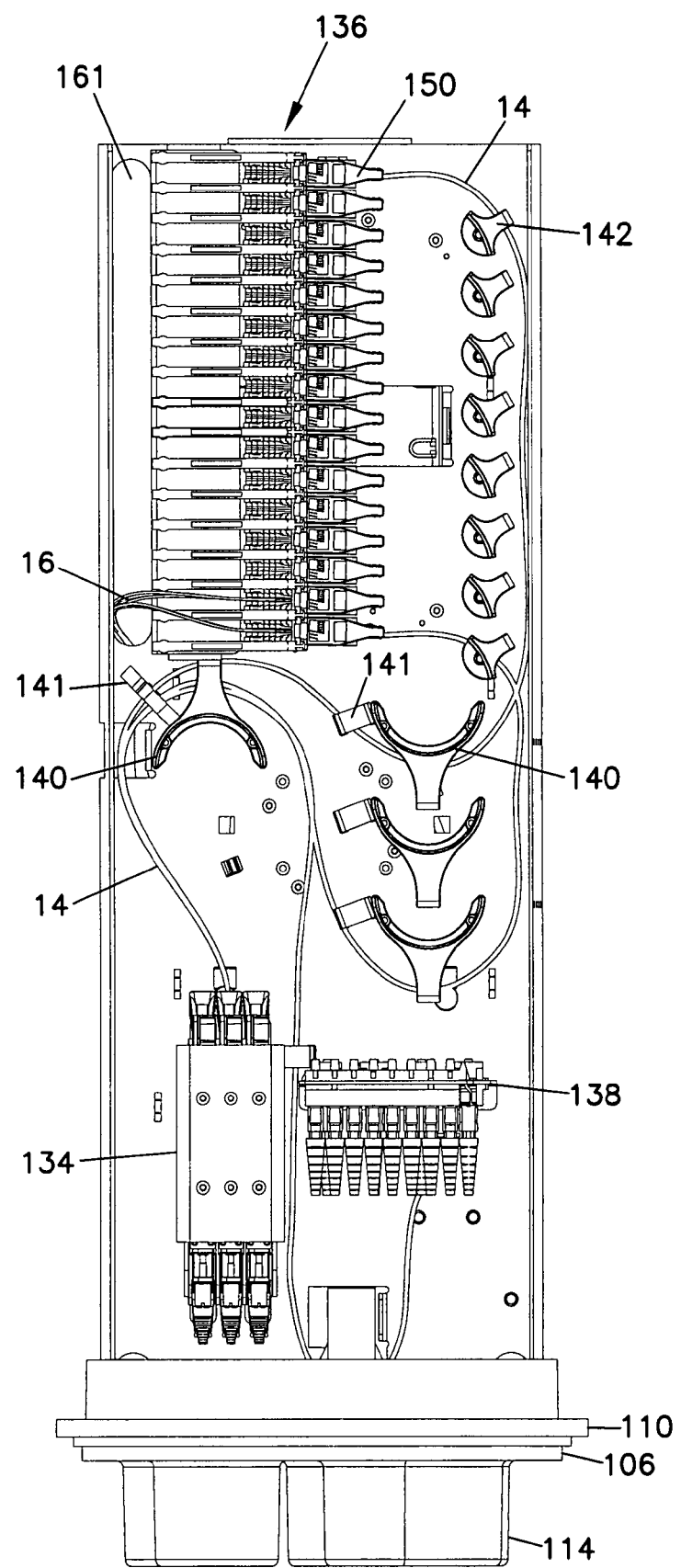
FIG. 6 is a front plan view of the fiber optic distribution assembly of FIG. 3, incorporating fiber optic cabling to illustrate optical signal routing.
Figure 7:
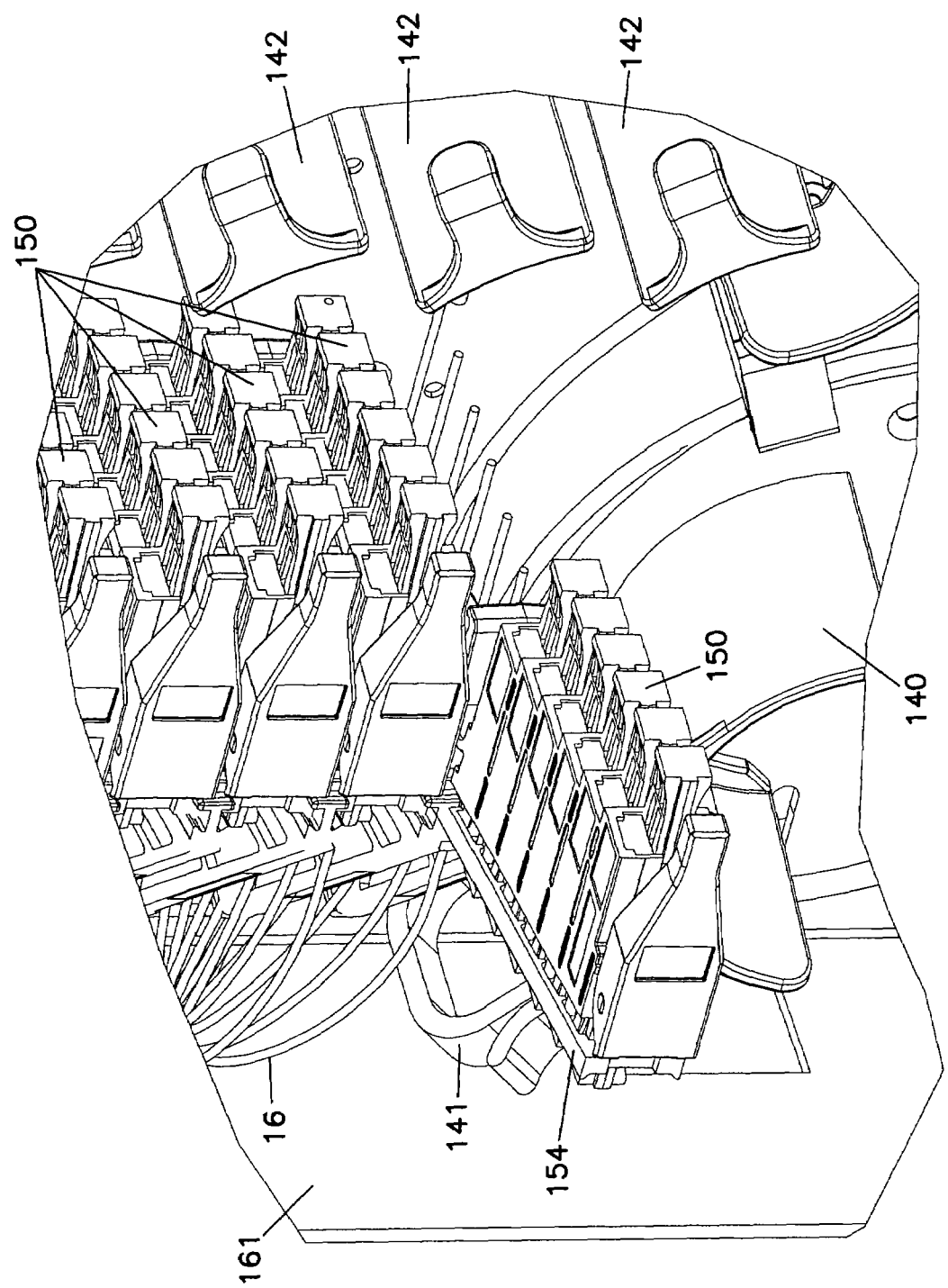
FIG. 7 is a close-up perspective view of a portion of the fiber optic distribution assembly of FIG. 3 showing a plurality of adapter modules.
Figure 8:
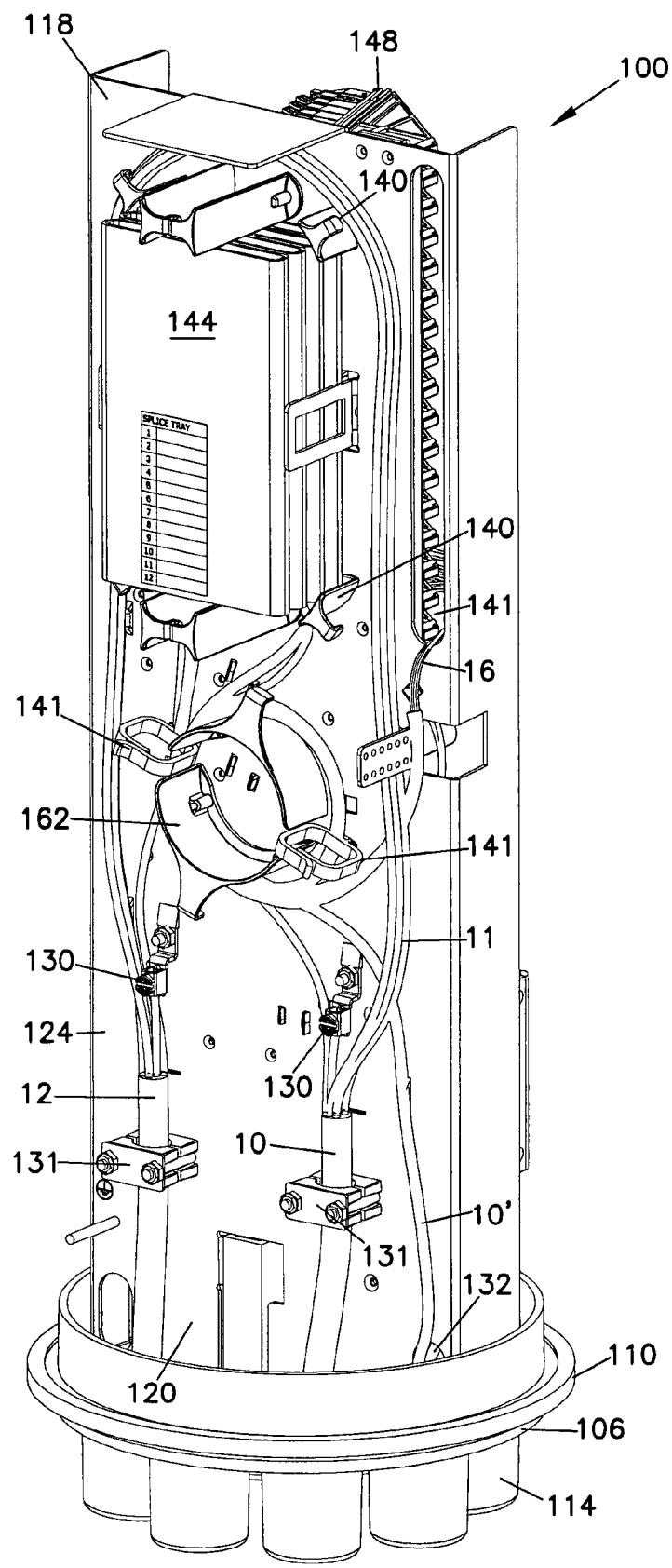
FIG. 8 is a rear perspective view of the fiber optic distribution assembly of FIG. 3 incorporating fiber optic cabling to illustrate optical signal routing.
Figure 9:
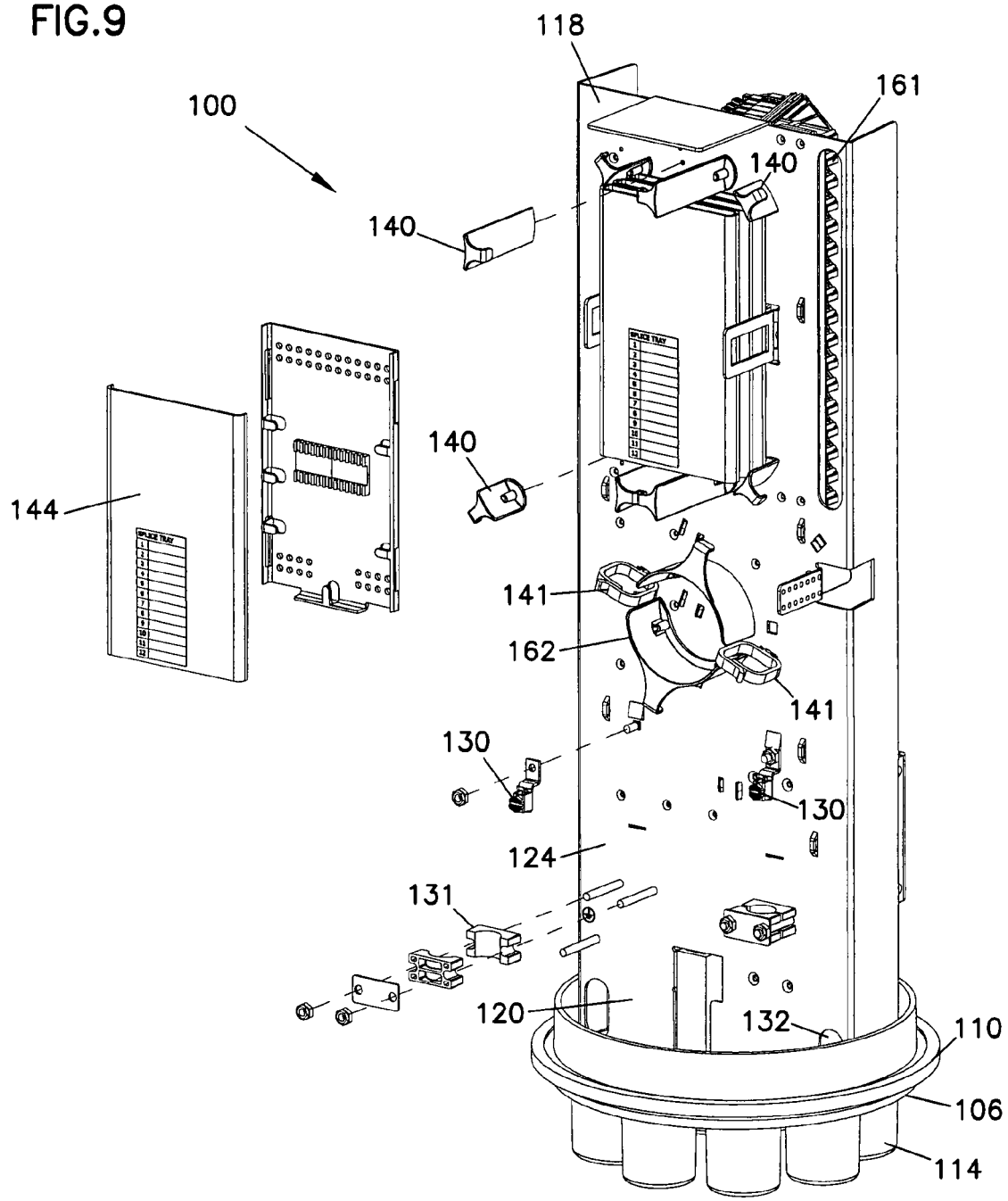
FIG. 9 is a rear perspective exploded view of the fiber optic distribution assembly of FIG. 3, with cabling removed.
Figure 10:
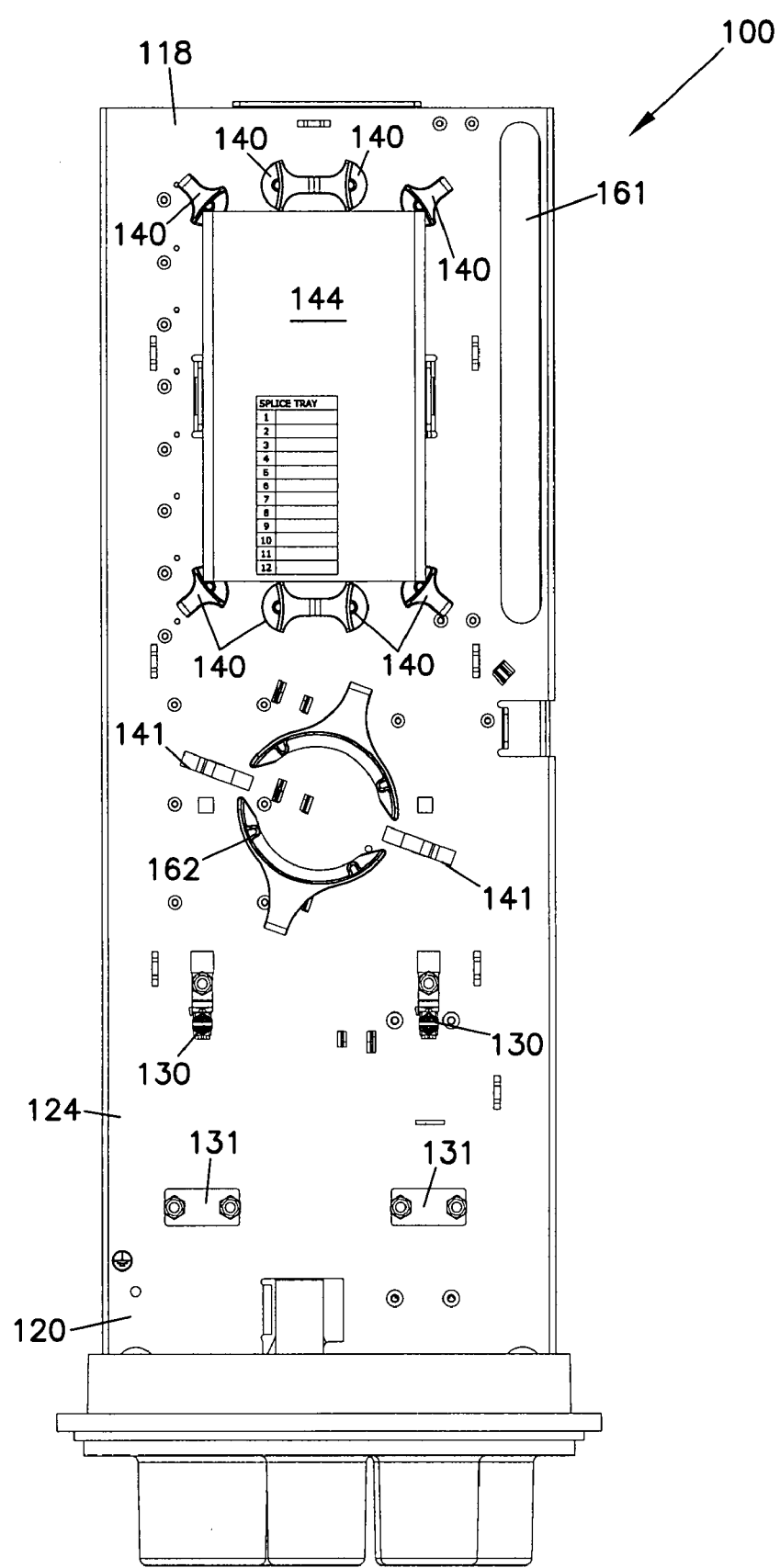
FIG. 10 is a rear plan view of the fiber optic distribution assembly of FIG. 3, with cabling removed.
Figure 11:
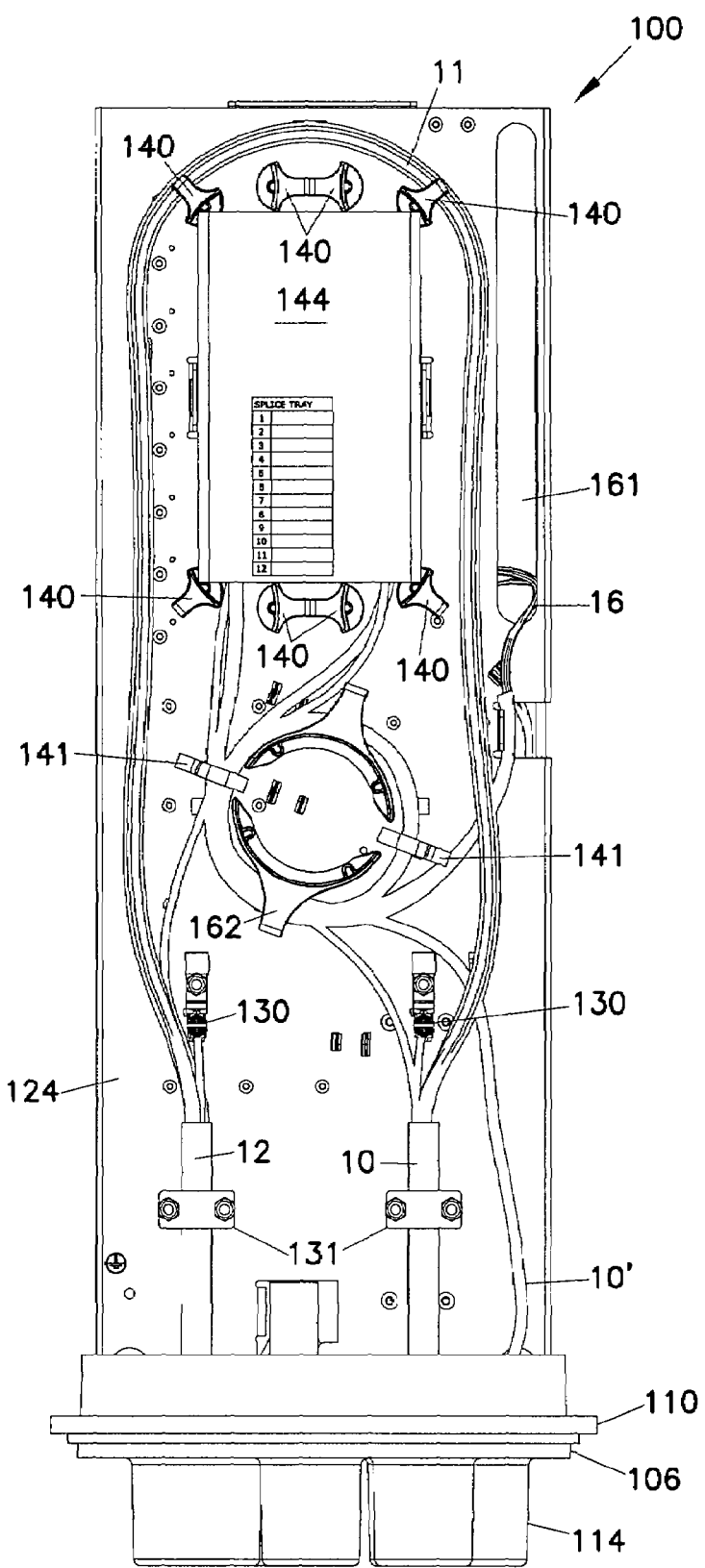
FIG. 11 is a rear plan view of the fiber optic distribution assembly of FIG. 3, incorporating fiber optic cabling to illustrate optical signal routing.
Figure 12:
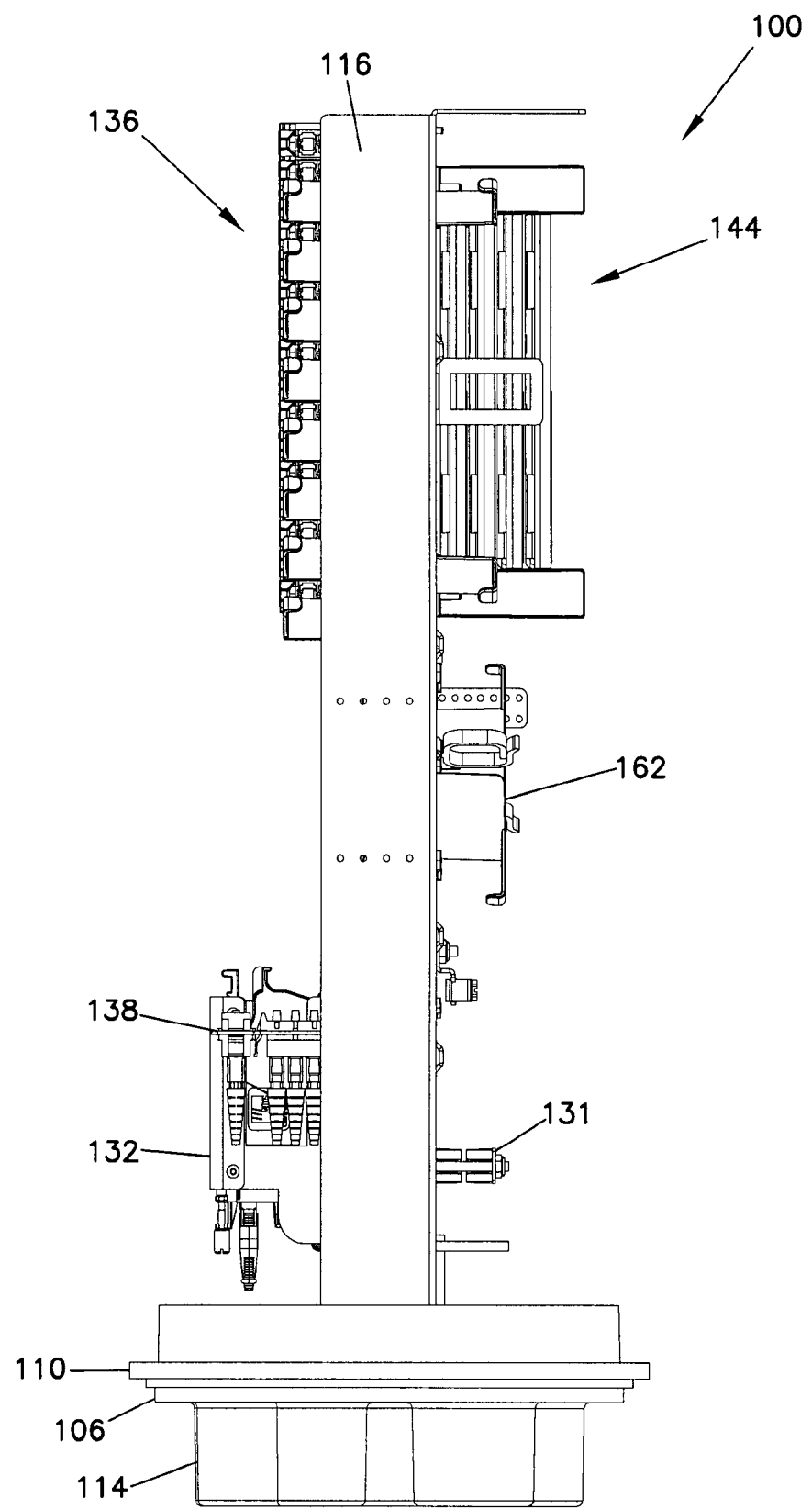
FIG. 12 is a side plan view of the fiber optic distribution assembly of FIG. 3, with cabling removed.

Referring to FIGS. 1-2, an enclosure 102 configured for use in a fiber optic cable distribution assembly 100 is illustrated. The enclosure 102 is useable in above ground and below ground applications and incorporating a number of fiber optic components, as described below.

The enclosure 102 is defined by a cover 104 and a base 106, and includes an interior volume for containing fiber optic components. The enclosure 102 is substantially cylindrical, and is constructed from watertight materials, such as metal or plastic. The enclosure has a top 103 and a bottom 105, defined by the cover 104 and base 106, respectively. The cover 104 and base 106 include mating abutting flanges 108, 110, respectively, and an O-ring (not shown). The abutting flanges 108, 110 are shaped for receiving a V-clamp (not shown) for forming a water-tight seal. In this manner, any water that might be present in an underground vault housing the fiber optic distribution cable assembly 100 does not reach the inner components of assembly 100. The clamping arrangement between the cover 104 and base 106 is described in further detail in U.S. patent application Ser. No. 11/137,855, the disclosure of which is incorporated by reference. It should be noted that a V-clamp/O-ring arrangement is one of the many possible sealing techniques that may be used to form a sealed enclosure 102 for distribution assembly 100.

In one possible embodiment, a BSE™ or BMT™ series thermoplastic sealed enclosure distributed by Channell Commercial Corporation may be used for the enclosure 102. In such an embodiment, the various internal fiber optic components within the enclosure 102 fit within a cylindrical internal space having a diameter determined by the enclosure.

In addition to the sealing arrangements, trapped air within the enclosure 102 prevents water from rising into the enclosure 102 due to the cylindrical, domed shape of the cover as shown. In one possible embodiment, the enclosure is pressurized, causing the air pressure in the interior of the enclosure 102 to exceed the atmospheric pressure outside the enclosure. Pressurization of the enclosure 102 helps further prevent moisture from penetrating the enclosure and reaching the fiber optic components in the interior of the assembly 100.

The base 106 includes a plurality of openings 112 sized to accept fiber optic cables of various sizes and configurations. In the embodiment shown, the openings are punch-through type openings. Each opening is surrounded by a cylindrical extension 114 extending downwardly from the base 106. The extensions 114 provide a location at which a seal can be formed between the cable and the enclosure 102. To insert a cable into the enclosure 102, an opening of the correct diameter is selected, and the punch-through plate guarding the opening is removed. The cable can then be inserted into the selected opening 112 for connection to components internal to the enclosure 102. Those openings which are not used remain capped or sealed to prevent water from entering the enclosure when it is sealed.

The enclosure 102 may be mounted in a variety of locations, depending upon the routing requirements of a fiber optic network in which the assembly 100 is incorporated. The enclosure can have a stand, pedestal or pole mount arrangement, or can also be installed in a rack or handhole location.

Referring now to FIGS. 3-12, the fiber optic distribution assembly 100 is shown with the cover 104 removed to allow access to the components in the interior of the assembly. The fiber optic distribution assembly 100 includes a mounting structure 116. The mounting structure 116 is generally planar, and includes a top 118, a bottom end 120, a front side 122, a rear side 124, a right side 126 and a left side 128.

The fiber optic cables include an input cable 10 and an output cable 12 each carrying a plurality of optical signals, as described below. The input and output cables 10, 12, respectively, enter the base 106 of the enclosure 102 and central strength members of the cables affix to the rear side 124 of a mounting structure 116 via support clamps 130. Fiber clamps 131 also hold the jackets of the input cable 10 and output cable 12 in place, and ground the jackets of the fiber cables 10, 12 to the mounting structure 116. One or more fiber strands in the input cable 10 are optionally spliced using a splice tray, described below, to secondary input cables 10' then routed to the front side 122 of the mounting structure 116 through an opening 132 near the bottom end 120. Fiber strands 11 from the input cable 10 which are not routed by the assembly 100 are placed around the perimeter of the rear side 124 of the mounting structure 116 and to the output cable 12.

The mounting structure 116 is configured to support a number of fiber optic components mounted to the front side 122 and rear side 124. The front side 122 of the mounting structure 116, shown in FIGS. 3-7, includes a splitter housing 134, an adapter assembly 136, an excess connector storage structure 138, and various radius limiters 140 and fan outs 142. The rear side 124 of the mounting structure 116, shown in FIGS. 8-11, includes an optional splice tray 144 and various other cable support and routing features. Layout and operation of these components are described below.

Adjacent the bottom end 120 of the front side 122 of the mounting structure 116, the fiber optic distribution assembly 100 includes a splitter housing 134, such as a splitter chassis or splitter bank. The splitter housing 134 houses a plurality of splitter modules 145 that split the incoming optical signals carried through the input cable 10 (i.e., a feeder cable, an outside plant cable, or an OSP cable), routed into the enclosure 102 through the base 106, into a plurality of secondary signals which can be distributed through the output cable 12 exiting through the base 106 to customer locations. In the embodiment shown, the splitter housing 134 accepts up to four splitter modules 145. Different numbers of splitter modules are possible depending upon the size of the enclosure and the number of connections desired.

Each splitter module 145 includes a plurality of input connectors 146 that extend along the module. The input connectors 146 preferably accept SC type connectors for optical signals. Splitter adapter assemblies 147 are positioned and arranged at the inputs of one or more splitter modules 145 such that when an input cable is slidably inserted into the splitter housing 134, input connectors 146 of the splitter modules 145 plug into the splitter adapter assemblies 147.

Dust plugs (not shown) are utilized when there is not a splitter module 145 connected to a splitter adapter assembly 147.

Once the input cable 10 or secondary input cable 10' is connected to the splitter module 145 through input connectors 146, each signal is split into twenty four signals by internal splitter circuitry within the splitter module. This type of a splitter configuration is called a 1×24 splitter. It should be noted that other splitter configurations such as a 1×32 splitter, a 2×16 splitter, a 1×16 splitter, etc., could be used in other embodiments depending upon the desired service. Split signal cables (i.e., secondary cables) 14 are then directed out of outputs 148 of splitter module 144. The split signal cables 14 are also preferably terminated with connectors.

As additional customers require fiber optic service, splitter modules 145 may be added to the assembly 100. The splitter modules 145 can be added or removed from the splitter housing 134 without interrupting or disrupting activity of other splitter modules present in the housing. Each splitter module 145 includes preconnectorized split signal cables, shown as secondary cables 14, which can be stored in the excess connector storage structure 138, described below, until use in the adapter assembly 136. Splitter modules similar to those shown herein are described in greater detail in commonly owned U.S. patent application Ser. Nos. 10/980,978, filed Nov. 3, 2004; 11/138,063, filed May 25, 2005; 11/138,889, filed May 25, 2005; and 11/354,297, filed Feb. 13, 2006, the entire disclosures of which are incorporated herein by reference.

One or more of the secondary cables 14 are routed and connected to the adapter assembly 136. The adapter assembly 136 resides at the top 118 of the front side 122 of the mounting structure 116. The adapter assembly 136 defines the connection routing from a service provider to one or more customers, and allows a service technician to conveniently activate and route fiber optic service to various pre-wired customer locations. The adapter assembly 136 includes 16 horizontally arranged adapter modules 148, each containing 6 adapters 150 for a total of 96 adapter connections. Different numbers of adapters 150 can be included in the adapter assembly 136 as well. The adapters 150 have an input end and an output end, and each end is configured to accept a preconnectorized fiber optic cable. Each adapter module 148 is mounted on an adapter module mount 152 that connect to the mounting structure 116. Adapter module mounts 152 provide structural support for and allow for slidability of adapter modules 148. Adapter module mounts 152 have extensions 154 for slidably receiving adapter modules 148.

Adapter modules 148 are horizontally disposed and slidable between a retracted position and an extended position forwardly from the mounting structure 116. The slidability of adapter modules 148 facilitates access to densely populated adapters 150 and the corresponding cable connectors therein. Similar sliding adapter modules are described in greater detail in commonly owned U.S. Pat. Nos. 5,497,444; 5,717,810; 6,591,051; and U.S. Patent Publication No. 2007/0025675, the disclosures of which are incorporated herein by reference.

For those customers that are not yet ready to receive fiber optic service, an excess connector storage structure 138 resides on the front side 122 of the mounting structure 116 next to the splitter housing 134, proximate the bottom end 120. A number of the split signal cables 14 may be directed to the excess connector storage structure 138 rather than the adapters 150 in the adapter assembly 136, described above.

The excess connector storage structure 138 includes a bulkhead 156 that defines mounting slots 158 for mounting connector holders 159. Each connector holder 159 includes a plurality of openings for receiving and releasably holding fiber optic connector such as the connectors on the split signal cables 14 extending from the splitter modules 144. In the embodiment shown, the excess connector storage structure 134 holds 40 connectors, with each of the mounting connector holders 159 holding eight connectors. In other embodiments, more or fewer connectors can be held in the storage structure 138. The openings in connector holders 159 may not provide a continuous optical path but rather house and protect a polished end face of an optical fiber within cable 14. This protection may be provided in combination with an endcap (not shown), such as shown in commonly-owned U.S. patent application Ser. No. 10/610,325, filed on Jun. 30, 2003, the disclosure of which is incorporated herein by reference.

In a possible configuration, a connector holder 159 may enclose and protect the polished end face of the connector terminating cable without the need for a protective endcap. Excess connector storage structure 138 and connector holder 159 are described in greater detail in commonly-owned U.S. patent application Ser. No. 10/871,555, filed on Jun. 18, 2004, the disclosure of which is incorporated herein by reference.

A radius limiter 140 resides between the splitter housing 134 and the adapter assembly 136, and routes the split signal cables 14 leading from the splitter housing 134 downwardly toward either the excess connector storage structure 138 or to one or more additional radius limiters 140. The unused split signal cables 14 route directly to the excess connector storage structure 138. For the split signal cables 14 which are to be used in active fiber connections, the cables are routed to the adapter assembly 136 via additional radius limiters 140 which in turn route the cables upwardly within the assembly 100 to a plurality of fanouts 142. The fanouts 142 also provide radius limiting protection and also redirect the now-upwardly oriented split signal cables 14 horizontally into an unoccupied adapter 150 within the adapter assembly 136. One or more cable clips 141 may hold the cables in place along the radius limiters 140.

Now referring back to the rear side 124 of the mounting structure 116, the fiber splice tray 144, resides opposite the adapter assembly 136, and houses up to four splice modules 160. The output connectors of the adapter assembly 136 connect to a second set of split signal cables 16 leading from the adapter assembly 136 which route through a slotted opening 161 along the edge of the mounting structure 116, and optionally into one or more of the splice modules 160 in the fiber splice tray 144.

The splice modules 160 receive optical cables from the adapter assembly 136, and fuse optical fibers together for signal transmission. In the cabling arrangement shown in FIG. 8, the input cable 10 is spliced in one splice module 160 with a secondary input cable 10' which leads through the opening 132 to the splitter modules 145 on the front side 122 of the mounting structure 116. Additionally, a second splice module 160 fuses the cables 16 leading from the adapter assembly 136 on the front side 122 with optical fibers within an output cable 12 leading out from the enclosure 102 to a customer location.

In an alternate embodiment, the splice tray 144 and splice modules 160 are not included in the assembly 100. In such an embodiment, the cables 16 can be connected to the output cable 12 by a second set of adapters, or the output cable 12 can be connectorized and directly connected to the output connectors of the adapter assembly 134.

An optional excess cable storage structure 162 mounts on the rear side 124 of the mounting structure 116, directly below the fiber splice tray 144. The excess cable storage structure 162 is a spool structure which provides a cable slack storage arrangement for excess length of the optical fibers of the input cable 10, output cable 12 or second split signal cables 16. The excess cable storage structure 162 also provides bend radius protection to the cables and routes the optical fibers of the input cable 10 and output cable 12 between the splice tray 144 and the bottom end of the assembly 100, where the cables enter or exit the openings 112 in the base 106. Cable clips 141 may be located near the optional excess cable storage structure 162 to hold optical cables in place on the spool.

Radius limiters 140 positioned near inputs and outputs of the splice tray guide and protect optical fibers entering one or more of the splice modules 160. Additional radius limiters 140 at each corner of the splice tray 144 guide the unrouted optical fiber strands 11 from the input cable 10 to the output cable 12 along the perimeter of the rear side 124 of the mounting structure 116.

FIGS. 13-17 show a second possible fiber optic distribution assembly 200 with the cover removed to provide access to inner components of the assembly. The assembly 200 can be environmentally protected using an enclosure such as disclosed in FIGS. 1-2, above.

The assembly 200 includes a mounting structure 216 configured to support fiber optic components mounted thereon. The mounting structure 216 includes a front side 222 and a rear side 224. The front side 222 of the mounting structure 216 includes a splitter housing 134, an adapter assembly 136, an excess connector storage structure 138, and various radius limiters 140 and fan outs 142. The rear side 224 of the mounting structure 216 includes a cable support structure 266 having a plurality of cable tie-downs 267, or an optional splice tray (not shown). The front and rear sides can include additional cable holding equipment, as well as various other cable support and routing features. Operation of these components and routing of optical signals among the components is described above in conjunction with the assembly 100.

Figure 13:
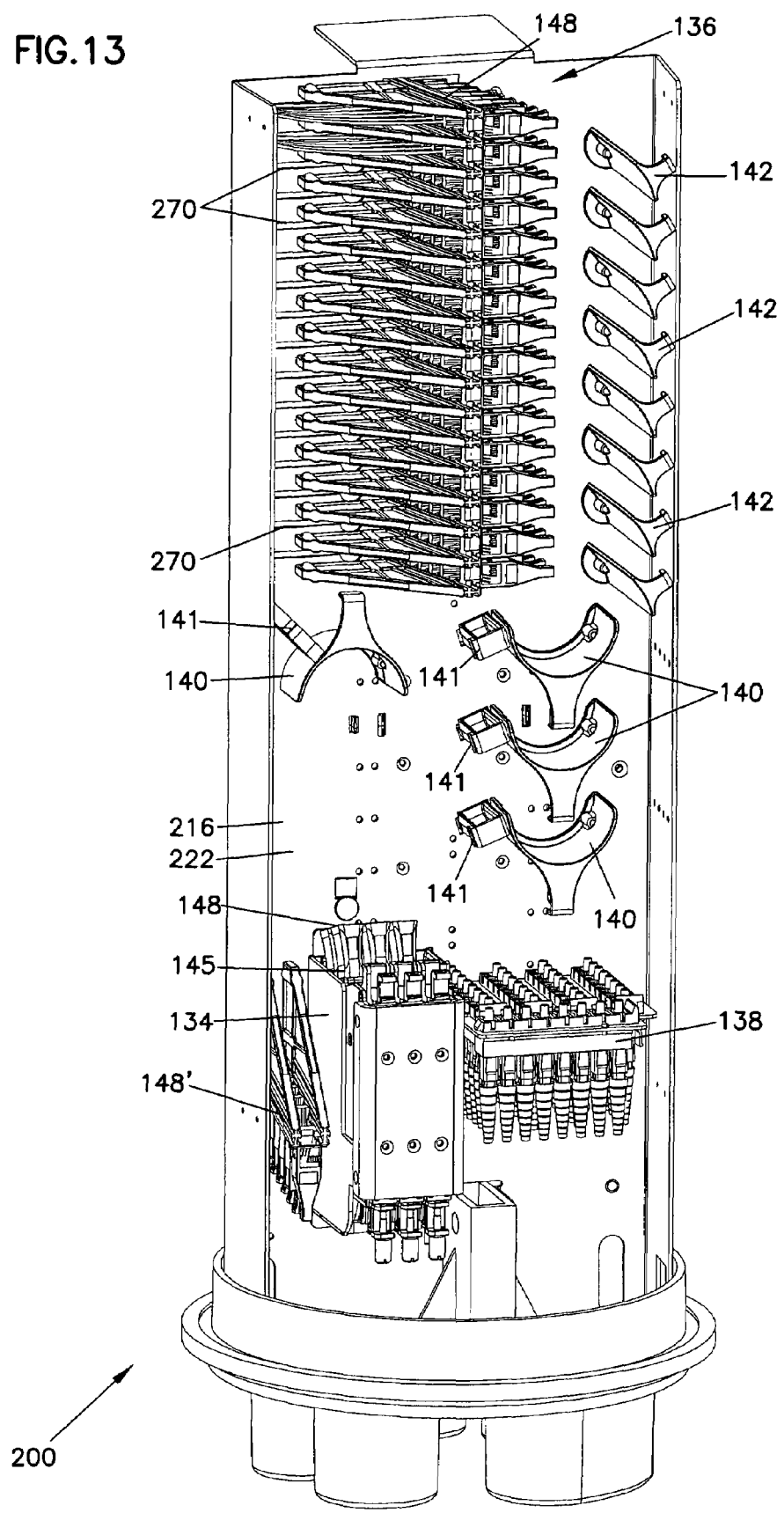
FIG. 13 is a front perspective view of a second possible fiber optic distribution assembly shown with the cover removed to provide access to inner components of the assembly and incorporating fiber optic cabling to illustrate optical signal routing.
Figure 14:
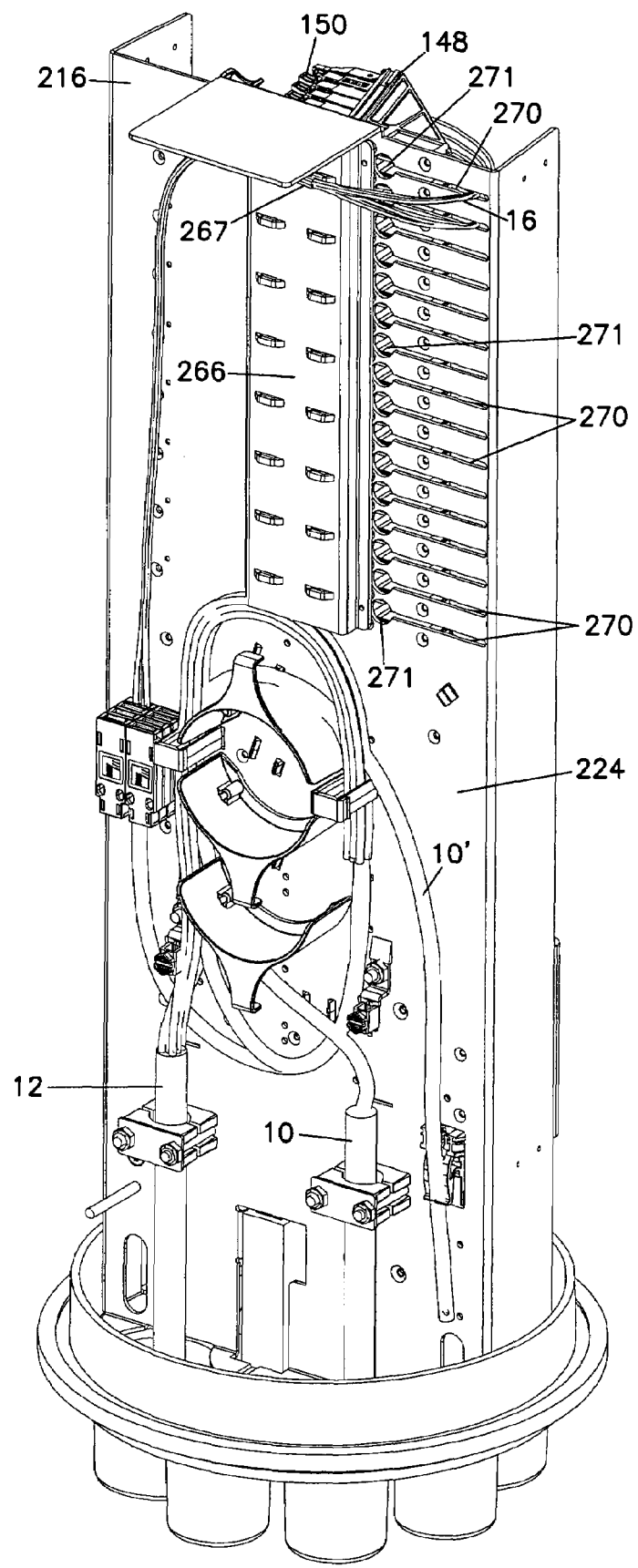
FIG. 14 is a rear perspective view of the fiber optic distribution assembly shown in FIG. 13.
Figure 15:
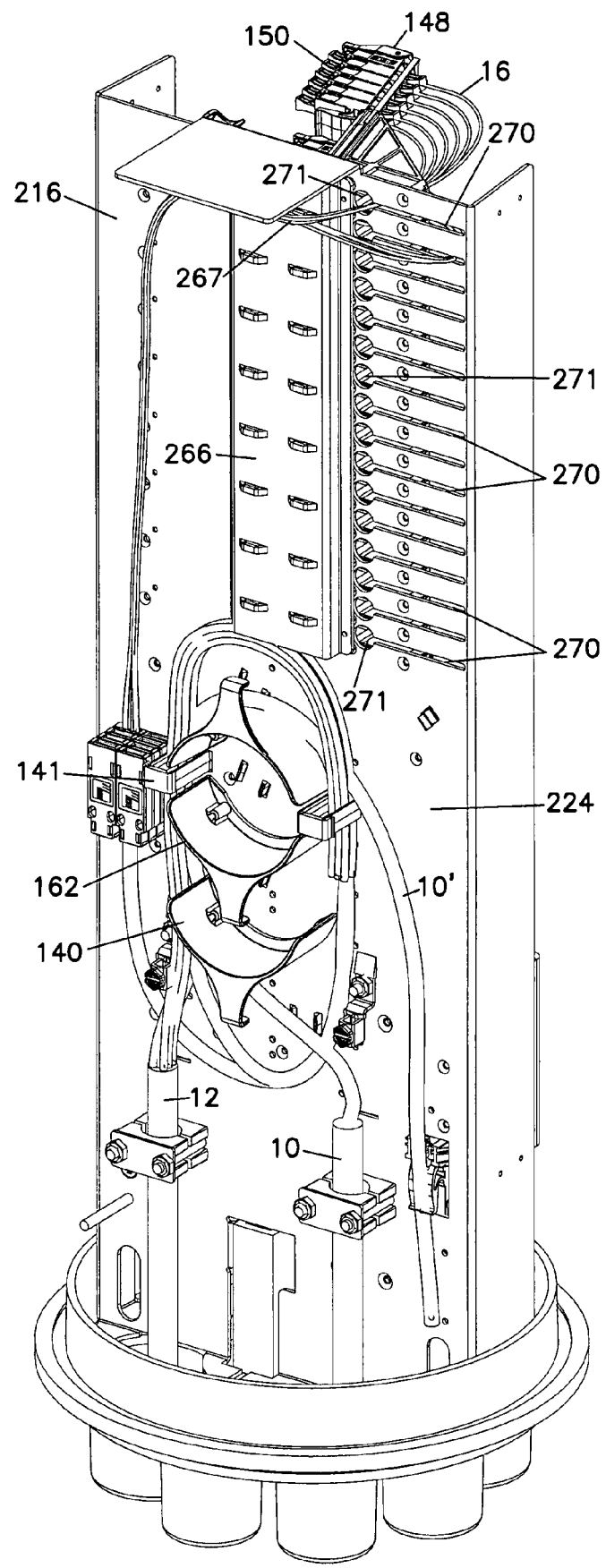
FIG. 15 is a further rear perspective view of the fiber optic distribution assembly of FIG. 13, with an adapter module in an extended position.
Figure 16:
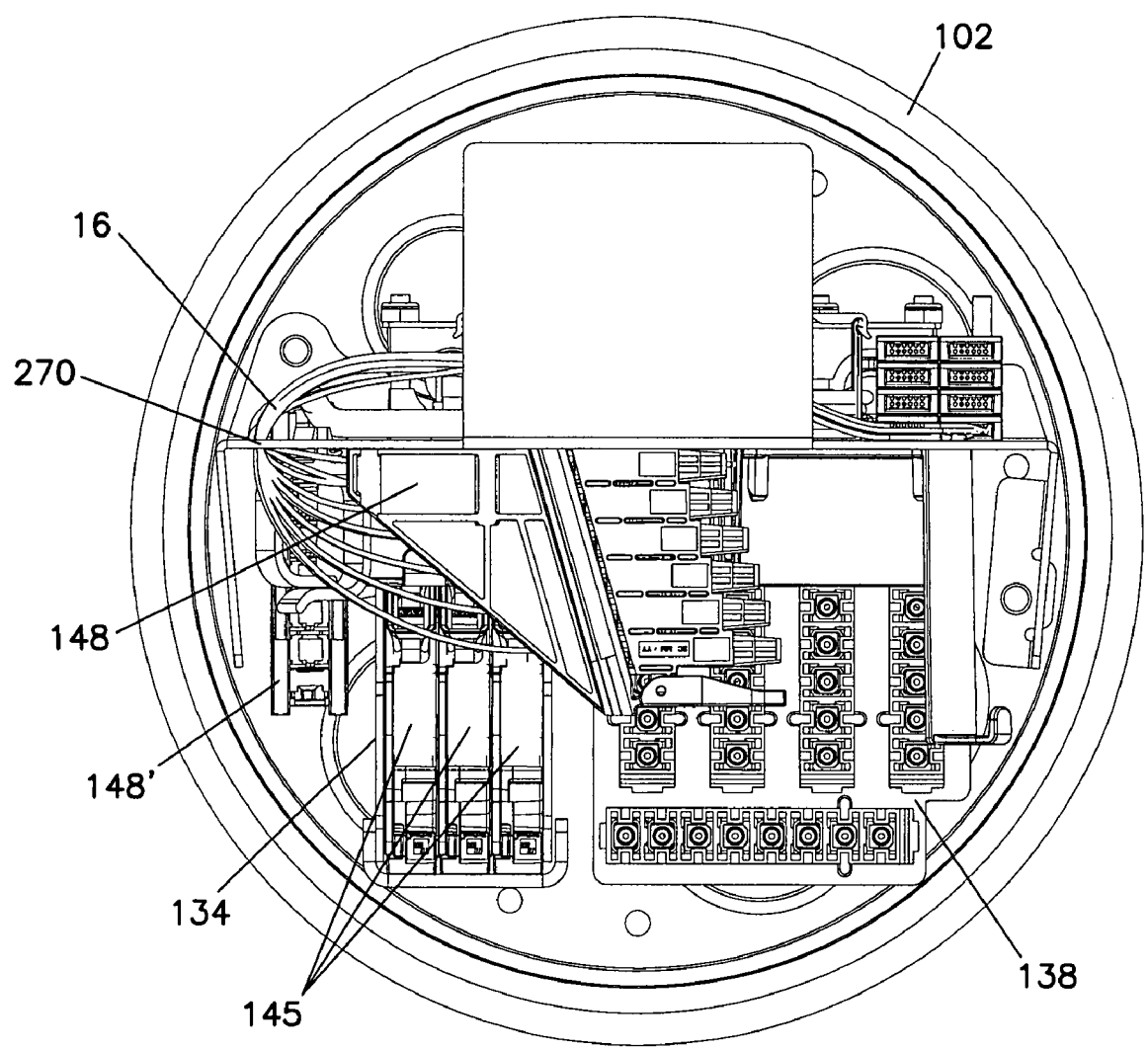
FIG. 16 is a top plan view of the fiber optic distribution assembly of FIG. 13.
Figure 17:
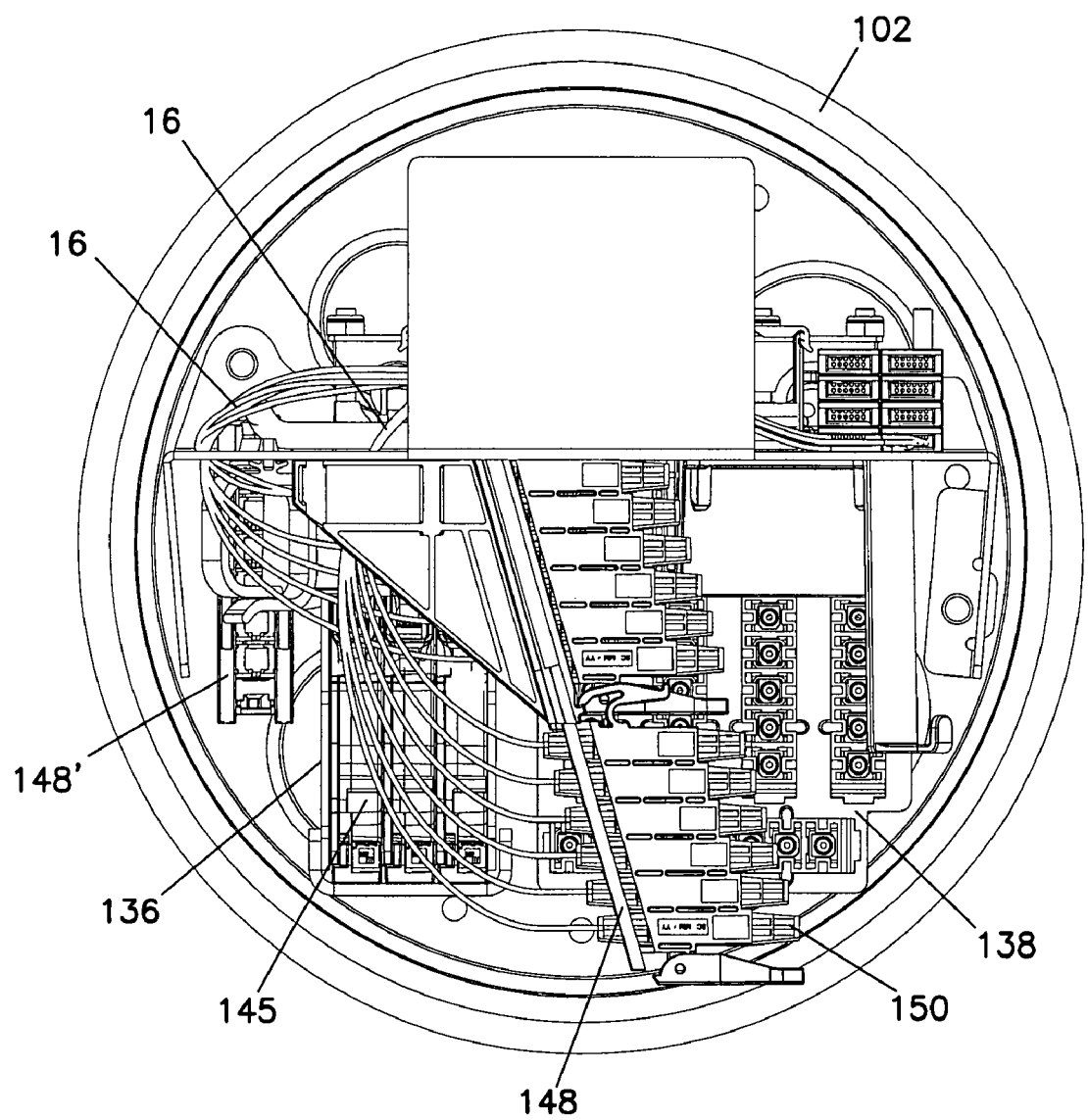
FIG. 17 is a further top plan view of the fiber optic distribution assembly of FIG. 13, with an adapter module in an extended position.

In a possible embodiment, a pass through adapter module 148' attaches to the mounting structure 216 alongside the splitter housing 134, as shown in FIG. 13. Single fiber or multifiber cables routed to the pass through adapter module 148' route optical signal cables through the assembly 200 along the same path as the cables split via splitter modules 145. Specifically, a cable received by the assembly 200 as part of an input cable 10 can be routed to the front side of the structure 216 and connected to either an adapter 150 in the pass through adapter module 148' or to a splitter adapter assembly 147 at the input of one of the splitter modules 145. Cables routed to the splitter adapter assembly 147 are split into 24 optical signals and routed as previously described. Cables routed to the pass through adapter module 148' are not split, and therefore connecting cables extend from the output of the adapter module 148' to route the plurality of optical signals to the adapter assembly 136 for connection, via an adapter 150 in an adapter module 148, to other cables leading out of the assembly 200. Alternatively, an output cable can connect directly to adapter module 148', and not pass through the adapter assembly 136.

The mounting structure 216 includes a plurality of cable routing slots 270 disposed along a top portion of one side of the structure, in the same location as the slotted opening 161 of the mounting structure 116, above. The cable routing slots 270 provide cable management and slack allowance for split signal cables 16 connected to the adapter modules, and are the method by which the split signal cables 16 leading from the adapter assembly 136 pass to the rear side of the mounting structure 216, where they attach to the cable support structure 266 or optionally enter a splice tray and then route out of the assembly 200.

Each of the cable routing slots 270 extends horizontally from the edge of the mounting structure toward an interior point proximate to the cable support structure 266 (or splice tray), at which each slot 270 terminates at a connector pass-through opening 271. The slots 270 are of a width to allow the split signal cables 16 to slide through, but are not sufficiently wide along the entire length to allow a connectorized end of a cable 16 to pass through the mounting structure 216. The connector pass-through openings 271 located at the end of each slot 270 have a larger diameter than the width of the slot, and are sufficiently large to allow the connectorized end of the split signal cables 16 to pass through the mounting structure 216. During installation or maintenance of the assembly 200, a technician passes the preconnectorized output cable from the cable support structure 266 or a splice tray through the connector pass-through openings 271 to connect to adapters 150 in the adapter assembly 136. In subsequent use, such as when a technician wishes to rearrange the fiber connections on the front side of the mounting structure 216, the technician will slide one or more of the adapter modules 148 from its retracted position to an extended position, as illustrated in FIGS. 14-17. Movement of the adapter, modules 148 between the retracted position and extended position causes the slackened split signal cables 16 connected to that module to be extended, resulting in the split signal cables 16 sliding along the slot. In a possible embodiment, the plurality of slots 270 corresponds to the number of adapter modules 148 in the adapter assembly 136, such that each of the adapter modules 148 is associated with a corresponding slot 270.

Cable routing in the assembly 200 corresponds to the routing described in the assembly 100 described above, but does not include routing through a splice tray. The input cable 10 enters the enclosure 102, and one or more fibers from that cable 10' are passed to the front side 222 of the mounting structure 216. The fibers 10' are connected to either one of the splitter modules 145, or to the pass through adapter module 148'. In the illustrated embodiment, cables 14 are routed from the splitter module 145 or adapter module 148' to the excess connector storage structure 138 or to the adapter modules 148, which connect to signal cables 16. The signal cables 16 pass through slots 270 to connect to the output cable 12, in this instance without first routing to a splice tray.

It is noted that, although in the foregoing description of the fiber optic distribution assemblies 100, 200, terms such as "upper", "lower", "front", "rear" are used for ease of description and illustration, no restriction is intended by use of such terms. The fiber optic distribution assemblies 100, 200 can be positioned in any orientation.

It is also noted that, for ease of illustration, only a fraction of the total number of cables, splitters, and other features utilized in the fiber optic distribution assemblies 100, 200 are illustrated in the above-described figures.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. An optical fiber distribution assembly comprising:
   an enclosure having a top, a bottom, and an interior, the enclosure formed by a base and a cover joined at a waterproof seal, the base including a plurality of openings, the plurality of openings configured to accept a input cable carrying an input signal and an output cable carrying an output signal;

a mounting structure within the interior of the enclosure forming a planar surface having a front side, a rear side, and top and bottom ends, the bottom end connected to the base and the top end extending toward the top of the enclosure;

a splitter housing located on the front side of the mounting structure adjacent the bottom end and including a fiber optic splitter, the fiber optic splitter configured to split the input signal into a plurality of secondary signals;

a plurality of adapters located on the front side of the mounting structure adjacent the top end, each adapter including a first connection end for receiving a connector terminated to a cable carrying one of the secondary signals and a second connection end for receiving a connector terminated to an optical cable, wherein the plurality of adapters are disposed on a plurality of adapter modules, the adapter modules slidable between retracted and extended positions; and an excess connector storage structure located on the front side of the mounting structure adjacent the bottom end, the excess connector storage structure configured to provide a termination location for optical cables carrying the plurality of secondary signals.

2. The optical fiber distribution assembly of claim 1, further comprising a fiber splice tray located on the rear side of the mounting structure adjacent the top end, the fiber splice tray containing at least one splice module configured to splice the output cable to the optical cable.

3. The optical fiber distribution assembly of claim 1, wherein the excess connector storage structure includes a plurality of openings for receiving and releasably holding fiber optic connectors.

4. The optical fiber distribution assembly of claim 1, further comprising a radius limiter located on the front side of the mounting structure between the splitter housing and the plurality of adapters.

5. The optical fiber distribution assembly of claim 1, further comprising a plurality of fanouts disposed vertically at a top end of the mounting structure and configured to fan out the plurality of secondary signals into the plurality of adapters.

6. The optical fiber distribution assembly of claim 2, further comprising a radius limiter located on the rear side of the mounting structure below the fiber splice tray.

7. The optical fiber distribution assembly of claim 1, wherein the air pressure within the enclosure is higher than the atmospheric pressure at the location of the enclosure.

8. The optical fiber distribution assembly of claim 1, wherein the plurality of adapters includes at least 16 adapter modules.

9. The optical fiber distribution assembly of claim 1, wherein the enclosure is cylindrical.

10. The optical fiber distribution assembly of claim 1, further comprising a plurality of linear slots through an upper side portion of the mounting structure.

11. The optical fiber distribution assembly of claim 10, wherein each slot includes a hole wider than a width of the linear slot and configured to allow preconnectorized cables to pass therethrough.

12. The optical fiber distribution assembly of claim 1, further comprising an adapter module located on the front side of the mounting structure outside of the splitter housing.

13. The optical fiber distribution assembly of claim 1, further comprising a plurality of cable routing slots through the mounting structure.

14. The optical fiber distribution assembly of claim 13, wherein the plurality of cable routing slots are formed in the mounting structure proximate to the plurality of adapters.

15. The optical fiber distribution assembly of claim 13, wherein the plurality of cable routing slots include connector pass-through openings allowing a connectorized end of a fiber optic cable to pass through the mounting structure.

16. The optical fiber distribution assembly of claim 1, further comprising an adapter module mounted to the front side of the mounting structure and located outside of the splitter housing, the adapter module configured to route optical signals from a cable through the assembly, the adapter module slidably mounted to the front side of the mounting structure.

17. An optical fiber distribution assembly comprising:
a cylindrical enclosure having a top, a bottom, and an interior, the enclosure formed by a base and a cover joined at a waterproof seal, the base including a plurality of openings, the plurality of openings configured to accept a plurality of fiber optic cables;

a substantially planar mounting structure having a front side, a rear side, and top and bottom ends, the bottom end connected to the base and the top end extending toward the top of the enclosure within the interior of the enclosure;

a splitter housing located on the front side of the mounting structure adjacent the bottom end and including a fiber optic splitter;

a plurality of adapters located on the front side of the mounting structure adjacent the top end, each adapter including a first connection end for receiving a connector;

an excess connector storage structure located on the front side of the mounting structure adjacent the bottom end and below the plurality of adapters, the excess connector storage structure configured to provide a termination location for optical cables carrying the plurality of secondary signals;

a cable management structure located on the front side of the mounting structure between the plurality of adapters and the splitter;

a plurality of fanouts vertically disposed at the top end of the front side of the mounting structure, the fanouts located laterally from and configured for routing optical fibers to the plurality of adapters.

18. The optical fiber distribution assembly of claim 17, further comprising a fiber splice tray located on the rear side of the mounting structure adjacent the top end, the fiber splice tray containing at least one splice module.

19. The optical fiber distribution assembly of claim 17, wherein the excess connector storage structure includes a plurality of openings for receiving and releasably holding fiber optic connectors.

20. The optical fiber distribution assembly of claim 17, wherein the plurality of adapters are disposed on a plurality of adapter modules, the adapter modules slidable between retracted and extended positions.

21. The optical fiber distribution assembly of claim 17, further comprising an adapter module mounted to the front side of the mounting structure and located adjacent the splitter housing, the adapter module configured to route optical signals from a multifiber cable through the assembly.

22. The optical fiber distribution assembly of claim 17, further comprising a plurality of cable routing slots through the mounting structure.

23. The optical fiber distribution assembly of claim 22, wherein the plurality of cable routing slots are formed in the mounting structure on an opposite side of the plurality of adapters from the fanouts.

24. The optical fiber distribution assembly of claim 22, wherein the plurality of cable routing slots include connector pass-through openings allowing a connectorized end of a fiber optic cable to pass through the mounting structure.

25. A method of routing fiber optic signals, the method comprising:
   accessing an interior of a fiber optic distribution assembly, the fiber optic distribution assembly including:
   an enclosure having a top, a bottom, and an interior, the enclosure formed by a base and a cover, the base including a plurality of openings, the plurality of openings configured to accept a input cable carrying an input signal and an output cable carrying an output signal;
   a mounting structure within the interior of the enclosure forming a planar surface having a front side, a rear side, and top and bottom ends, the bottom end connected to the base and the top end extending toward the top of the enclosure;
   a splitter housing located on the front side of the mounting structure adjacent the bottom end and including a fiber optic splitter, the fiber optic splitter configured to split the input signal into a plurality of secondary signals;
   a plurality of adapters located on the front side of the mounting structure adjacent the top end, each adapter including a first connection end for receiving a connector terminated to a cable carrying one of the secondary signals and a second connection end for receiving a connector terminated to an optical cable;
   an excess connector storage structure located on the front side of the mounting structure adjacent the bottom end, the excess connector storage structure including a plurality of openings for receiving and releasably holding fiber optic connectors; and
   a plurality of fanouts vertically disposed at the top end of the front side of the mounting structure, the fanouts located laterally from and configured for routing optical fibers to the plurality of adapters;
   routing optical cables from the front side to the rear side of the mounting structure through one or more openings in the mounting structure;
   detaching an optical cable carrying a secondary signal from the excess connector storage structure; and
   routing the optical cable carrying the secondary signal to an adapter via at least one radius limiter and at least one of the plurality of fanouts.

26. The method of claim 25, further comprising sealing the cover to the base of the enclosure to form a watertight seal.

27. An optical fiber distribution assembly comprising:
   an enclosure having a top, a bottom, and an interior, the enclosure formed by a base and a cover joined at a waterproof seal, the base including a plurality of openings, the plurality of openings configured to accept a input cable carrying an input signal and an output cable carrying an output signal;
   a mounting structure within the interior of the enclosure forming a planar surface having a front side, a rear side, and top and bottom ends, the bottom end connected to the base and the top end extending toward the top of the enclosure;
   a splitter housing located on the front side of the mounting structure adjacent the bottom end and including a fiber optic splitter, the fiber optic splitter configured to split the input signal into a plurality of secondary signals;
   a plurality of adapters located on the front side of the mounting structure adjacent the top end, each adapter including a first connection end for receiving a connector terminated to a cable carrying one of the secondary signals and a second connection end for receiving a connector terminated to an optical cable; and
   an excess connector storage structure located on the front side of the mounting structure adjacent the bottom end, the excess connector storage structure configured to provide a termination location for optical cables carrying the plurality of secondary signals;
   wherein the air pressure within the enclosure is higher than the atmospheric pressure at the location of the enclosure.

28. An optical fiber distribution assembly comprising:
   an enclosure having a top, a bottom, and an interior, the enclosure formed by a base and a cover joined at a waterproof seal, the base including a plurality of openings, the plurality of openings configured to accept a input cable carrying an input signal and an output cable carrying an output signal;
   a mounting structure within the interior of the enclosure forming a planar surface having a front side, a rear side, and top and bottom ends, the bottom end connected to the base and the top end extending toward the top of the enclosure;
   a splitter housing located on the front side of the mounting structure adjacent the bottom end and including a fiber optic splitter, the fiber optic splitter configured to split the input signal into a plurality of secondary signals;
   a plurality of adapters located on the front side of the mounting structure adjacent the top end, each adapter including a first connection end for receiving a connector terminated to a cable carrying one of the secondary signals and a second connection end for receiving a connector terminated to an optical cable; and
   an excess connector storage structure located on the front side of the mounting structure adjacent the bottom end, the excess connector storage structure configured to provide a termination location for optical cables carrying the plurality of secondary signals;
   wherein the enclosure is cylindrical.

29. An optical fiber distribution assembly comprising:
   an enclosure having a top, a bottom, and an interior, the enclosure formed by a base and a cover joined at a waterproof seal, the base including a plurality of openings, the plurality of openings configured to accept a input cable carrying an input signal and an output cable carrying an output signal;
   a mounting structure within the interior of the enclosure forming a planar surface having a front side, a rear side, and top and bottom ends, the bottom end connected to the base and the top end extending toward the top of the enclosure;
   a splitter housing located on the front side of the mounting structure adjacent the bottom end and including a fiber optic splitter, the fiber optic splitter configured to split the input signal into a plurality of secondary signals;
   a plurality of adapters located on the front side of the mounting structure adjacent the top end, each adapter including a first connection end for receiving a connector terminated to a cable carrying one of the secondary signals and a second connection end for receiving a connector terminated to an optical cable;
   an excess connector storage structure located on the front side of the mounting structure adjacent the bottom end, the excess connector storage structure configured to provide a termination location for optical cables carrying the plurality of secondary signals; and a plurality of linear slots through an upper side portion of the mounting structure, wherein each slot includes a hole wider than a width of the linear slot and configured to allow preconnectorized cables to pass therethrough.

30. An optical fiber distribution assembly comprising:

an enclosure having a top, a bottom, and an interior, the enclosure formed by a base and a cover joined at a waterproof seal, the base including a plurality of openings, the plurality of openings configured to accept a input cable carrying an input signal and an output cable carrying an output signal;

a mounting structure within the interior of the enclosure forming a planar surface having a front side, a rear side, and top and bottom ends, the bottom end connected to the base and the top end extending toward the top of the enclosure;

a splitter housing located on the front side of the mounting structure adjacent the bottom end and including a fiber optic splitter, the fiber optic splitter configured to split the input signal into a plurality of secondary signals;

a plurality of adapters located on the front side of the mounting structure adjacent the top end, each adapter including a first connection end for receiving a connector terminated to a cable carrying one of the secondary signals and a second connection end for receiving a connector terminated to an optical cable;

an excess connector storage structure located on the front side of the mounting structure adjacent the bottom end, the excess connector storage structure configured to provide a termination location for optical cables carrying the plurality of secondary signals; and a plurality of cable routing slots through the mounting structure.

31. The optical fiber distribution assembly of claim 30, wherein the plurality of cable routing slots are formed in the mounting structure proximate to the plurality of adapters.

32. The optical fiber distribution assembly of claim 30, wherein the plurality of cable routing slots include connector pass-through openings allowing a connectorized end of a fiber optic cable to pass through the mounting structure.

33. An optical fiber distribution assembly comprising:

an enclosure having a top, a bottom, and an interior, the enclosure formed by a base and a cover joined at a waterproof seal, the base including a plurality of openings, the plurality of openings configured to accept a input cable carrying an input signal and an output cable carrying an output signal;

a mounting structure within the interior of the enclosure forming a planar surface having a front side, a rear side, and top and bottom ends, the bottom end connected to the base and the top end extending toward the top of the enclosure;

a splitter housing located on the front side of the mounting structure adjacent the bottom end and including a fiber optic splitter, the fiber optic splitter configured to split the input signal into a plurality of secondary signals;

a plurality of adapters located on the front side of the mounting structure adjacent the top end, each adapter including a first connection end for receiving a connector terminated to a cable carrying one of the secondary signals and a second connection end for receiving a connector terminated to an optical cable, wherein the plurality of adapters are disposed on a plurality of adapter modules, the adapter modules slidable between retracted and extended positions;

an excess connector storage structure located on the front side of the mounting structure adjacent the bottom end, the excess connector storage structure configured to provide a termination location for optical cables carrying the plurality of secondary signals; and an adapter module mounted to the front side of the mounting structure and located outside of the splitter housing, the adapter module configured to route optical signals from a cable through the assembly, the adapter module slidably mounted to the front side of the mounting structure.

* * * * *